US010249393B2

(12) United States Patent
Park et al.

(10) Patent No.: US 10,249,393 B2
(45) Date of Patent: Apr. 2, 2019

(54) MODULAR REACTOR STEAM GENERATOR CONFIGURED TO COVER A REACTOR OUTER WALL CIRCUMFERENCE

(71) Applicant: KEPCO ENGINEERING & CONSTRUCTION COMPANY, INC., Gimcheon-si, Gyeongsangbuk-do (KR)

(72) Inventors: Sung Ho Park, Daejeon (KR); Jong Min Kim, Daejeon (KR); Kyu Wan Kim, Gimcheon-si (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 132 days.

(21) Appl. No.: 15/445,394

(22) Filed: Feb. 28, 2017

(65) Prior Publication Data

US 2018/0033500 A1 Feb. 1, 2018

(30) Foreign Application Priority Data

Jul. 27, 2016 (KR) .................. 10-2016-0095493

(51) Int. Cl.
*G21C 15/12* (2006.01)
*F22B 1/00* (2006.01)
(Continued)

(52) U.S. Cl.
CPC .............. *G21C 15/12* (2013.01); *F16T 1/00* (2013.01); *F22B 1/00* (2013.01); *G21C 1/32* (2013.01);
(Continued)

(58) Field of Classification Search
CPC .......... G21C 15/12; G21C 1/32; G21C 13/02; G21C 15/243; G21C 1/09; G21D 1/006; F16T 1/00; F22B 1/00
(Continued)

(56) References Cited

U.S. PATENT DOCUMENTS 3,331,747 A * 7/1967 Williamson ........... G21C 13/02
376/406
4,818,476 A * 4/1989 Gasparro ............... G21C 13/06
376/294
(Continued)

FOREIGN PATENT DOCUMENTS

KR         100286518 B1    1/2000
KR   1020150014491 A       2/2015
(Continued)

OTHER PUBLICATIONS

Office Action dated Nov. 15, 2016 of the Korean Patent Application No. 10-2016-0095493.

*Primary Examiner* — Jack W Keith
*Assistant Examiner* — Daniel Wasil
(74) *Attorney, Agent, or Firm* — Nixon Peabody LLP; Jeffrey L. Costellia

(57) ABSTRACT

In an externally integrated once-through steam generator type small modular reactor, a steam generator is arranged along the circumference of a reactor vessel, and secondary cooling water flows in heat transfer tubes and changes to superheated steam. The small modular reactor includes: a nuclear reactor including a hemispherical upper head, the reactor vessel cylindrical shell coupled to the upper head and extending downward from the upper head in a cylindrical shape, and a hemispherical lower head provided on a lower portion of the reactor vessel cylindrical shell, wherein a core is placed in the nuclear reactor; the steam generator surrounding all around the reactor vessel cylindrical shell, the steam generator including a first penetration hole communicating with an inside of the nuclear reactor and a second penetration hole separate from the first penetration hole and communicating with the inside of the nuclear reactor.

16 Claims, 11 Drawing Sheets

(51) Int. Cl.
  *F16T 1/00*       (2006.01)
  *G21C 1/32*       (2006.01)
  *G21C 13/02*      (2006.01)
  *G21C 15/243*     (2006.01)
  *G21D 1/00*       (2006.01)
  *G21C 1/09*       (2006.01)

(52) U.S. Cl.
  CPC ............ *G21C 13/02* (2013.01); *G21C 15/243* (2013.01); *G21D 1/006* (2013.01); *G21C 1/09* (2013.01); *Y02E 30/40* (2013.01)

(58) Field of Classification Search
  USPC .................................................. 376/395, 402
  See application file for complete search history.

(56) References Cited

U.S. PATENT DOCUMENTS

| | | |
|---|---|---|
| 9,478,317 B2 | 10/2016 | Faith et al. |
| 2013/0121453 A1* | 5/2013 | Shargots .............. G21C 15/243 376/395 |
| 2015/0110236 A1 | 4/2015 | Singh |

FOREIGN PATENT DOCUMENTS

| | | |
|---|---|---|
| KR | 101630428 B1 | 6/2016 |
| KR | 1020160081081 A | 7/2016 |

\* cited by examiner

MODULAR REACTOR STEAM GENERATOR CONFIGURED TO COVER A REACTOR OUTER WALL CIRCUMFERENCE

CROSS-REFERENCE TO RELATED APPLICATION

This application claims the benefit of Korean Patent Application No. 10-2016-0095493, filed on Jul. 27, 2016, in the Korean Intellectual Property Office, the disclosure of which is incorporated herein in its entirety by reference.

BACKGROUND

1. Field

One or more embodiments relate to an externally integrated once-through steam generator type small modular reactor capable of generating superheated steam from secondary cooling water flowing in heat transfer tubes, and more particularly, to an externally integrated once-through steam generator type small modular reactor in which a steam generator is arranged along the circumference of a reactor vessel in order to increase the heat transfer area of the steam generator, simplify the structure of the small modular reactor, and increase the spatial efficiency of the small modular reactor.

2. Description of the Related Art

In general, a reactor coolant system of a large pressurized-water reactor nuclear power plant includes a nuclear reactor, steam generators, reactor coolant pumps, and pipes connecting the components. The reactor cooling system may have a loop structure in which two to four steam generators are arranged around the nuclear reactor, one or two reactor coolant pumps are arranged for each of the steam generators, and pipes are welded to nozzles of the components. The steam generators include heat transfer U-tubes, evaporators, moisture separators, and steam dryers.

In such a reactor coolant system of a large pressurized-water reactor nuclear power plant, pipes for connecting components to a nuclear reactor, steam generators, and reactor coolant pumps are individually installed. However, it is difficult to repair and maintain the pipes installed as described above, and accidents such as leakage of a coolant may occur because of pipe break.

That is, large nuclear power plants have to be designed by assuming break at both ends of pipes exposed to high pressure and high temperature and considering factors such as dynamic loads and pressure surges caused by break at both ends of pipes and are required to satisfy complex design specifications including environment verification so as to maintain integrity and functional stability in radioactivity and steam conditions in case of coolant leakage.

Meanwhile, small-medium modular reactors are designed to have an integrated structure in which steam generators and reactor coolant pumps are integrated in a reactor vessel for removal of connection pipes and pipe welding. FIG. 1 illustrates a typical small-medium modular reactor of the related art including a steam generator 20 provided in a reactor vessel 10.

Referring to FIG. 1, the small-medium modular reactor of the related art includes the reactor vessel 10, the steam generator 20 provided in the reactor vessel 10, a core 30, turbines 40, and motor pumps 50. Since the steam generator 20 is installed in the reactor vessel 10, pipes may not be used in the small-medium modular reactor of the related art. However, the small-medium modular reactor of the related art may have the following problems.

In the small-medium modular reactor of the related art, a complex structure is used to maintain a pressure boundary between secondary cooling water used in the steam generator 20 provided in the reactor vessel 10 and primary cooling water used for circulating heat generated in the core 30. That is, in the small-medium modular reactor in which the steam generator 20 is provided in the reactor vessel 10, a pressure boundary between primary cooling water and secondary cooling water is scattered in the reactor vessel 10, and thus a complex structure is used to maintain the pressure boundary.

Furthermore, in the small-medium modular reactor in which the steam generator 20 is provided in the reactor vessel 10, moisture separators and steam dryers may not be installed in the steam generator 20 but may have to be installed in separate devices outside the steam generator 20 or the reactor vessel 10.

A pressurizer of a large nuclear power plant is installed in a reactor coolant system as an independent component, and the temperature of a fluid in the pressurizer is markedly different from the temperature of the fluid in a reactor coolant system pipe according to operational states. In this case, a thermal stratification flow may occur in a surge line connecting the pressurizer to the reactor coolant system pipe, thereby causing a large degree of stress and requiring a space and support structures for the surge line.

In the small-medium modular reactor of the related art in which the steam generator 20 is provided in the reactor vessel 10, a pressurizer 60 is integrated in an upper head 70 for removal of a surge line and an installation space. However, the complex structure of the small-medium modular reactor of the related art may limit access paths for inspection, repair, and maintenance of the inside of the pressurizer 60 and a penetration portion of the upper head 70.

RELATED ART DOCUMENT

Patent Document (Patent Document 1) Korean Patent Application Laid-open Publication No. 10-2014-0021121 (Feb. 20, 2014)

SUMMARY

One or more embodiments include an externally integrated once-through steam generator type small modular reactor in which a once-through steam generator capable of generating superheated steam from secondary cooling water flowing in heat transfer tubes is arranged along the circumference of a reactor vessel so as to increase the heat transfer area of the steam generator, simplify the structure of the small modular reactor, and increase the spatial efficiency of the small modular reactor.

Additional aspects will be set forth in part in the description which follows and, in part, will be apparent from the description, or may be learned by practice of the presented embodiments.

According to one or more embodiments, an externally integrated once-through steam generator type small modular reactor includes: a nuclear reactor including an upper head, a reactor vessel cylindrical shell having a cylindrical shape and coupled to the upper head, and a lower head provided on a lower portion of the reactor vessel cylindrical shell, wherein a core is placed in the nuclear reactor; and a steam generator surrounding the reactor vessel cylindrical shell and including a first penetration hole and a second penetration hole, the first penetration hole communicating with an inside of the nuclear reactor, the second penetration hole being separate from the first penetration hole and communicating with the inside of the nuclear reactor.

The steam generator may further include: a steam generator inner shell integrated with or formed in one piece with the reactor vessel cylindrical shell and surrounding 360 degrees a circumference of the reactor vessel cylindrical shell, the steam generator inner shell sharing a portion with the reactor vessel cylindrical shell and extending in a longitudinal direction of the reactor vessel cylindrical shell; and a steam generator outer shell spaced apart from the steam generator inner shell and surrounding 360 degrees the circumference of the reactor vessel cylindrical shell, the steam generator outer shell extending in the longitudinal direction of the reactor vessel cylindrical shell, wherein the first penetration hole and the second penetration hole may be provided in a region in which the reactor vessel cylindrical shell and the steam generator inner shell are integrated with or formed in one piece with each other and may be used as flow paths allowing a fluid to flow between the inside of the nuclear reactor and an inside of the steam generator. The steam generator may further include: a steam generator upper head connecting an upper portion of the steam generator inner shell to an upper portion of the steam generator outer shell; and a steam generator lower head connecting a lower portion of the steam generator outer shell to the reactor vessel cylindrical shell, wherein the steam generator upper head may have a semicircular or semielliptical cross section and may extend in a ring shape along a circumference of the steam generator, and the steam generator lower head may have a circular-arc cross section and may extend in a ring shape along the circumference of the steam generator.

A manway may be detachably coupled to the steam generator upper head or the steam generator lower head for inspection and maintenance of a heat transfer tube of the steam generator. A plurality of partition plates may be arranged at intervals inside the steam generator along the circumference of the steam generator, and a plurality of steam generator modules may be respectively provided in spaces separated by the partition plates. The externally integrated once-through steam generator type small modular reactor may further include a cylindrical tube installed in the steam generator lower head and the reactor vessel cylindrical shell in such a manner that the cylindrical tube penetrates the steam generator lower head and the reactor vessel cylindrical shell. The cylindrical tube may be coupled to the partition plates. A reactor coolant pump may be provided in the cylindrical tube.

A cylindrical core support barrel assembly extending in the longitudinal direction of the reactor vessel cylindrical shell and accommodating the core may be provided inside the nuclear reactor; and the core support barrel assembly may include a core penetration hole communicating with the first penetration hole, and the second penetration hole may communicate with a space between the reactor vessel cylindrical shell and the core support barrel assembly. A lower heat transfer tube sheet may be provided in a lower portion of the steam generator, the lower heat transfer tube sheet being coupled to the steam generator inner shell and the steam generator outer shell and having a plate shape along a circumference of the steam generator; an upper heat transfer tube sheet may be provided in an upper portion of the steam generator, the upper heat transfer tube sheet being coupled to the steam generator inner shell and the steam generator outer shell having a plate shape along the circumference of the steam generator; and the externally integrated once-through steam generator type small modular reactor may further include a heat transfer tube coupled to the lower heat transfer tube sheet and the upper heat transfer tube sheet and extending straight from the lower heat transfer tube sheet to the upper heat transfer tube sheet.

The lower heat transfer tube sheet or the upper heat transfer tube sheet may be integrated with or formed in one piece with the steam generator inner shell and the steam generator outer shell. The externally integrated once-through steam generator type small modular reactor may further include a plate-shaped shroud placed between the steam generator inner shell and the heat transfer tube and extending from a lower portion of the steam generator inner shell toward an upper portion of the steam generator inner shell, the shroud extending in a ring shape along a circumference of the steam generator inner shell.

A pressurizer plate in which an electric heater is installed to heat a fluid may be provided in the nuclear reactor, and a surge hole may be formed in the pressurizer plate to allow a fluid to pass therethrough. A protrusion protruding inward from the nuclear reactor and having a stud bolt hole may be provided on the protrusion, and the pressurizer plate may be coupled to the protrusion using a stud bolt.

An cylindrical shell flange may protrude inward from the reactor vessel cylindrical shell and may include a stud bolt hole, an upper head flange may protrude outward from the upper head and may include a stud bolt hole, and the upper head and the reactor vessel cylindrical shell may be coupled to each other by joining the cylindrical shell flange and the upper head flange using a stud bolt. The externally integrated once-through steam generator type small modular reactor may be manufactured by coupling a plurality of forged members to each other.

A space formed on an upper portion of the reactor vessel cylindrical shell and surrounded by the steam generator inner shell may be configured to be filled with a reactor coolant and can be utilized as a refueling pool during refueling operation.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
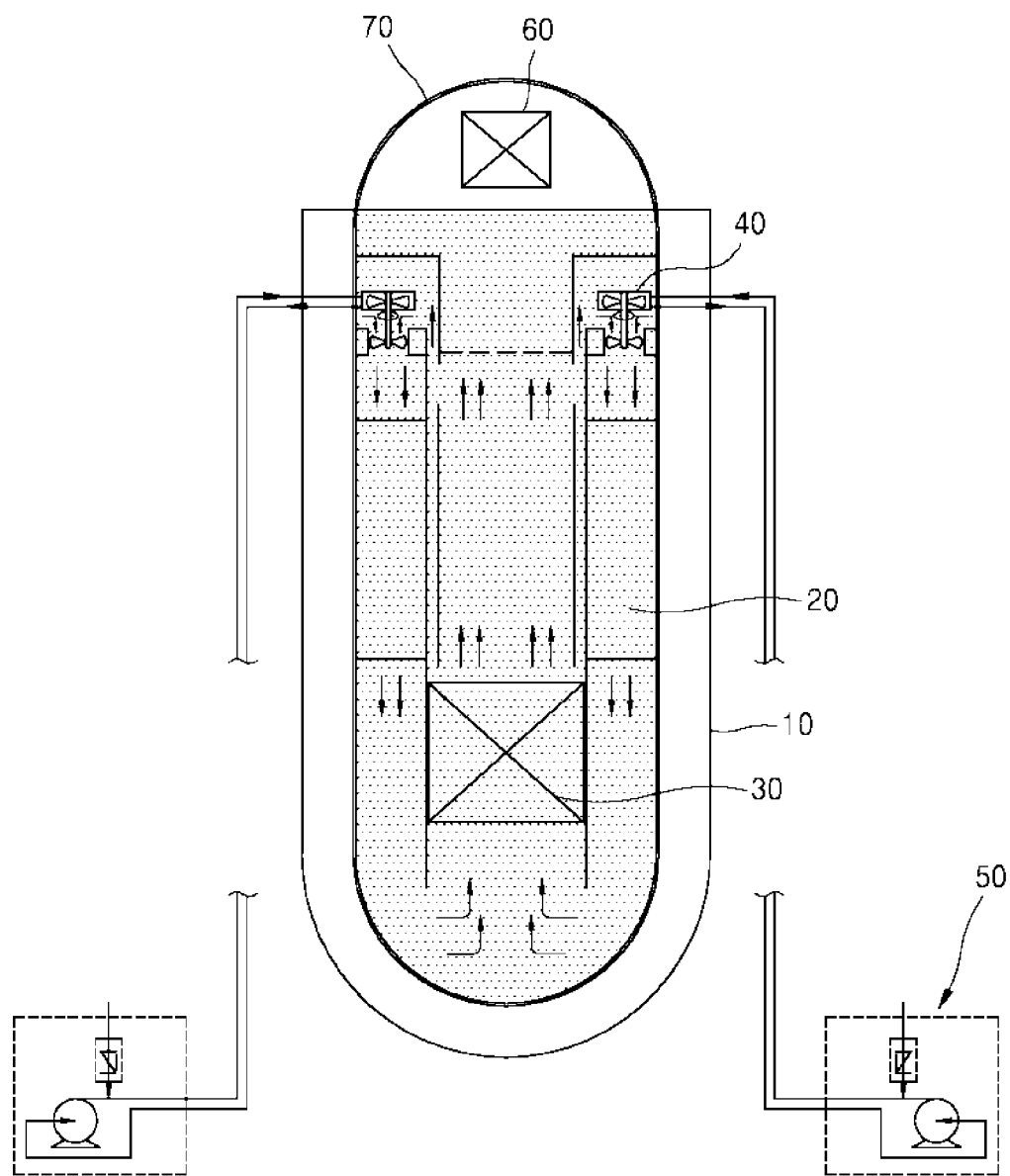
FIG. 1 is a view illustrating a typical internally integrated steam generator type reactor of the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed.

One or more embodiments relate to an externally integrated once-through steam generator type small modular reactor in which a once-through steam generator capable of generating superheated steam from secondary cooling water flowing in heat transfer tubes is arranged along the circumference of a reactor vessel so as to increase the heat transfer area of the steam generator, simplify the structure of the small modular reactor, and increase the spatial efficiency of the small modular reactor.

According to an embodiment, the externally integrated once-through steam generator type small modular reactor includes: a nuclear reactor 110 including an upper head 111, a reactor vessel cylindrical shell 112, and a lower head 113; and a steam generator 130, wherein the externally integrated once-through steam generator type small modular reactor is configured to increase the heat transfer area of the steam generator 130 and have a simple structure and a high degree of spatial efficiency. In the externally integrated once-through steam generator type small modular reactor of the embodiment, the steam generator 130 includes first penetration holes 120 communicating with the inside of the nuclear reactor 110 and second penetration holes 121 separated from the first penetration holes 120 and communicating with the inside of the nuclear reactor 110.

Figure 2:
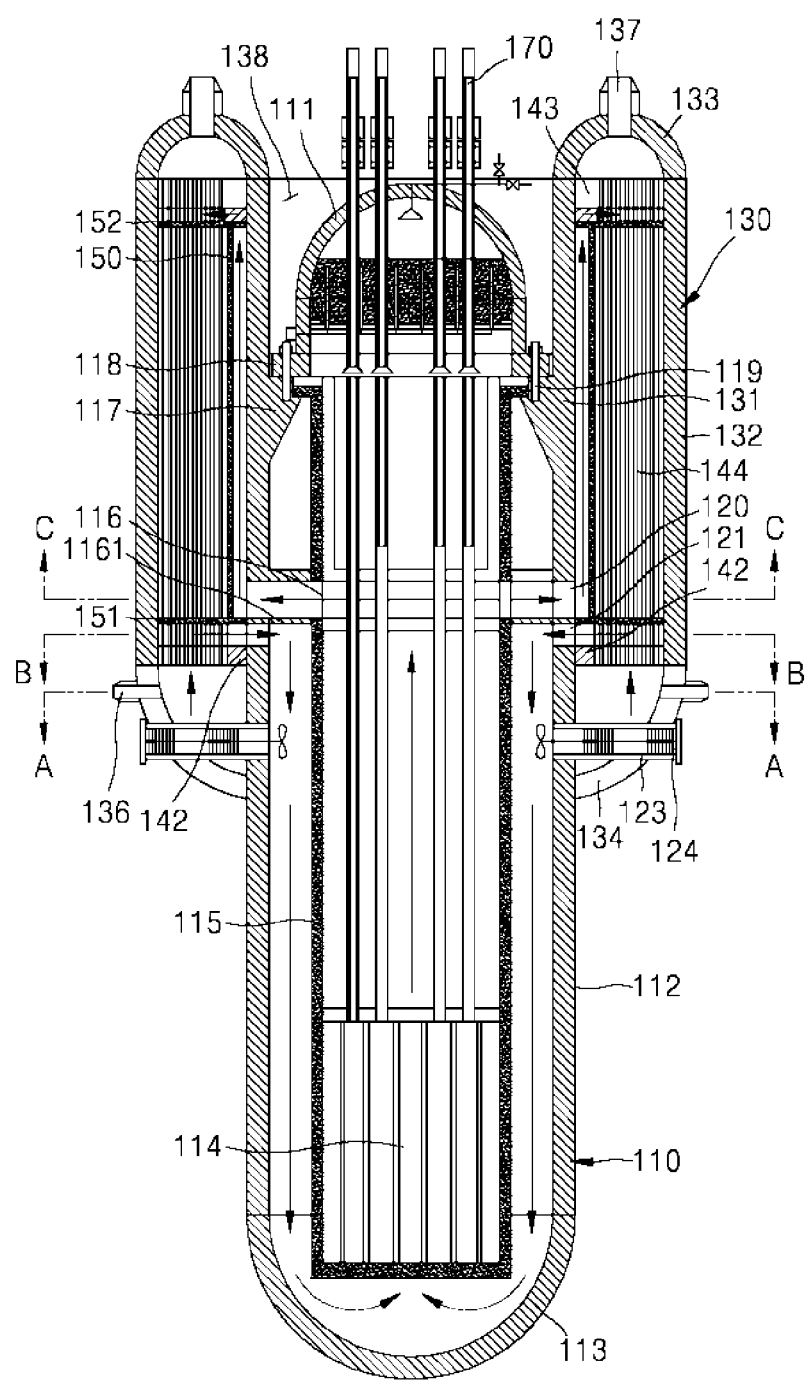
FIG. 2 is a view illustrating an externally integrated once-through steam generator type small modular reactor according to an embodiment.

Referring to FIG. 2, the nuclear reactor 110 includes: the upper head 111; the reactor vessel cylindrical shell 112 coupled to the upper head 111 and having a cylindrical shape; and the lower head 113 provided on a lower portion of the reactor vessel cylindrical shell 112. A core 114 is provided inside the nuclear reactor 110. The upper head 111 may be variously shaped. For example, the upper head 111 may have a hemispherical shape. The reactor vessel cylindrical shell 112 is coupled to the upper head 111 and extends downward from the upper head 111. The upper head 111 and the reactor vessel cylindrical shell 112 may be coupled to each other using an upper head flange 118 provided on the upper head 111 and a cylindrical shell flange 117 provided on the reactor vessel cylindrical shell 112. The lower head 113 may be variously shaped. For example, the lower head 113 may have a hemispherical shape.

The steam generator 130 surrounds the circumference of the reactor vessel cylindrical shell 112 and includes: the first penetration holes 120 communicating with the inside of the nuclear reactor 110; and the second penetration holes 121 separated from the first penetration holes 120 and communicating with the inside of the nuclear reactor 110.

The steam generator 130 includes: a steam generator inner shell 131 integrated with or formed in one piece with the reactor vessel cylindrical shell 112 and surrounding 360 degrees the circumference of the reactor vessel cylindrical shell 112, the steam generator inner shell 131 sharing a portion with the reactor vessel cylindrical shell 112 and extending in a longitudinal direction of the reactor vessel cylindrical shell 112; and a steam generator outer shell 132 spaced apart from the steam generator inner shell 131 and surrounding 360 degrees the circumference of the reactor vessel cylindrical shell 112, the steam generator outer shell 132 extending in the longitudinal direction of the reactor vessel cylindrical shell 112.

The steam generator inner shell 131 is integrated with or formed in one piece with the reactor vessel cylindrical shell 112. The steam generator outer shell 132 is spaced apart from the steam generator inner shell 131 and surrounding 360 degrees the circumference of the reactor vessel cylindrical shell 112 and extends upward from the reactor vessel cylindrical shell 112 in the longitudinal direction of the reactor vessel cylindrical shell 112 (here, the longitudinal direction of the reactor vessel cylindrical shell 112 is a direction in which the upper head 111, the reactor vessel cylindrical shell 112, and the lower head 113 are arranged).

Figure 3:
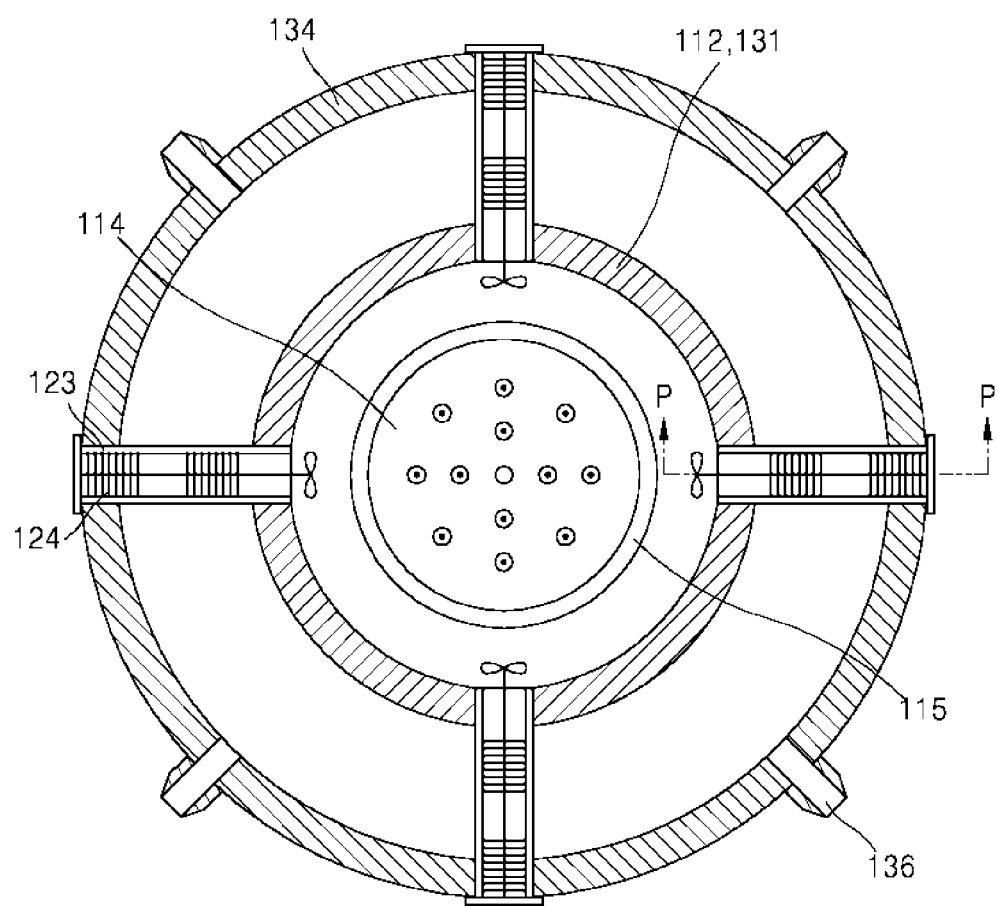
FIG. 3 is a cross sectional view taken along a line A-A of FIG. 2, illustrating a lower portion of the externally integrated once-through steam generator type small modular reactor based on the line A-A according to an embodiment.

The steam generator inner shell 131 and the steam generator outer shell 132 surround the reactor vessel cylindrical shell 112 and have a doughnut-shaped cross section. Referring to FIG. 3, the steam generator inner shell 131 and the steam generator outer shell 132 have a doughnut-shaped cross section in which the nuclear reactor 110 is placed.

The steam generator 130 may further include: a steam generator upper head 133 connecting an upper portion of the steam generator inner shell 131 to an upper portion of the steam generator outer shell 132; and a steam generator lower head 134 connecting a lower portion of the steam generator outer shell 132 to the reactor vessel cylindrical shell 112.

The steam generator upper head 133 has a semicircular cross section and extends in a ring shape along the circumference of the steam generator 130. That is, the steam generator upper head 133 has a semicircular cross section and surrounds an upper portion of the steam generator 130 in a doughnut shape. Since the steam generator upper head 133 has a semicircular cross section, a space in which a fluid may stay may be formed. Instead of having a semicircular cross section, the steam generator upper head 133 may have another cross sectional shape such as a semielliptical shape.

The steam generator lower head 134 has a circular-arc cross section and extends in a ring shape along the circumference of the steam generator 130. That is, the steam generator lower head 134 has a circular-arc cross section and connects the steam generator outer shell 132 to the reactor vessel cylindrical shell 112 while surrounding a lower portion of the steam generator 130 in a doughnut shape. Since the steam generator lower head 134 has a circular-arc cross section, a fluid may smoothly flow along the shape of the steam generator lower head 134. In a non-limiting example, the steam generator lower head 134 may have a quarter-circular cross section. However, the steam generator lower head 134 may have another circular-arc cross sectional shape.

The first penetration holes 120 and the second penetration holes 121 function as flow paths allowing a fluid to flow between the inside of the nuclear reactor 110 and the inside of the steam generator 130. That is, two opening groups are formed in the steam generator 130 to allow a fluid to flow to the inside of the nuclear reactor 110. In other words, owing to the first penetration holes 120 and the second penetration holes 121, the steam generator 130 is connected to the nuclear reactor 110 without using pipes, and a fluid may flow therebetween. The first penetration holes 120 are separate from the second penetration holes 121, and when the flow of a fluid (described later) is considered, the first penetration holes 120 may be provided above the second penetration holes 121.

The first penetration holes 120 and the second penetration holes 121 may be provided in a region in which the steam generator inner shell 131 and the reactor vessel cylindrical shell 112 are integrated with or formed in one piece with each other. For example, the second penetration holes 121 may be formed in a region in which the steam generator lower head 134 and the reactor vessel cylindrical shell 112 are coupled to each other, and the first penetration holes 120 may be formed above the second penetration holes 121.

Figure 5:
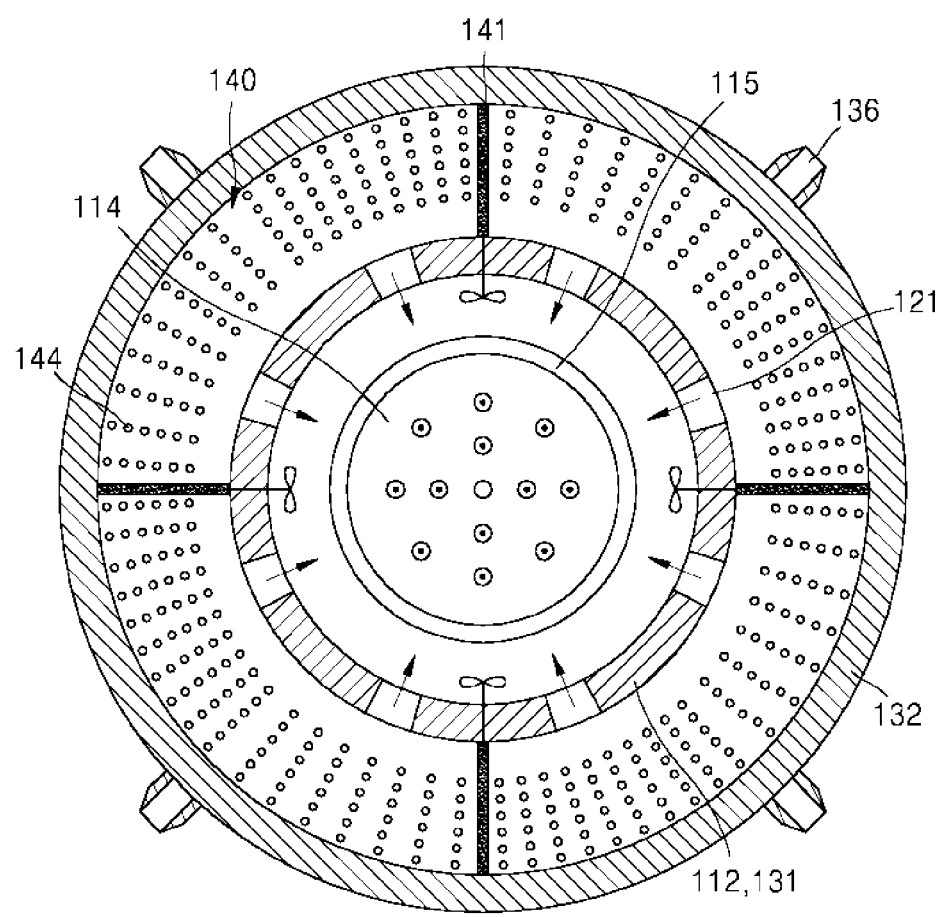
FIG. 5 is a cross sectional view taken along a line B-B of FIG. 2, illustrating a lower portion of the externally integrated once-through steam generator type small modular reactor based on the line B-B according to an embodiment.
Figure 6:
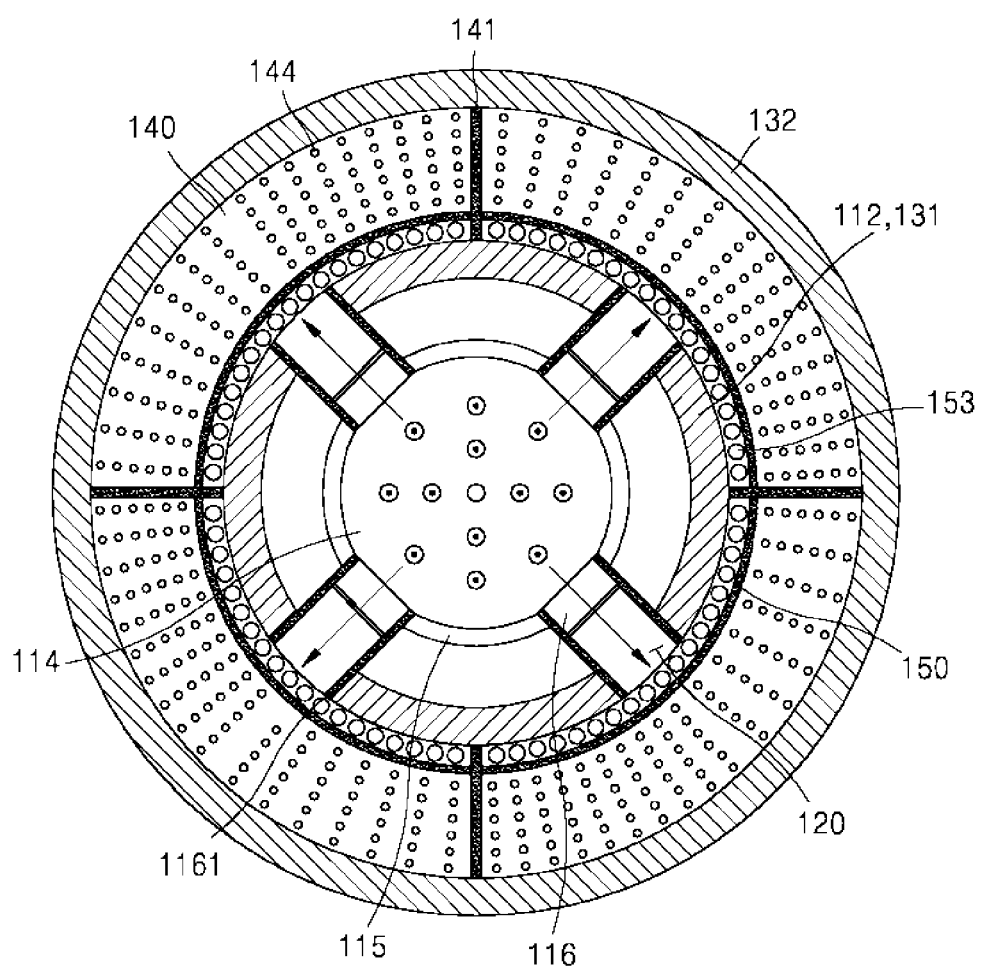
FIG. 6 is a cross sectional view taken along a line C-C of FIG. 2, illustrating an upper portion of the externally integrated once-through steam generator type small modular reactor based on the line C-C according to an embodiment.

Referring to FIGS. 5 and 6, a plurality of partition plates 141 are arranged at intervals inside the steam generator 130 along the circumference of the steam generator 130. The partition plates 141 extend in the longitudinal direction of the reactor vessel cylindrical shell 112 and divide an inner space of the steam generator 130. Steam generator modules 140 are respectively placed in regions of the divided inner space of the steam generator 130. That is, the steam generator modules 140 may be independently arranged in the inner space of the steam generator 130 divided by the partition plates 141. That is, two or more steam generator modules 140 may be provided, and the number or capacity of the steam generator modules 140 may be adjusted (FIG. 5 is a cross sectional view taken along a line B-B of FIG. 2, illustrating a lower portion of the externally integrated once-through steam generator type small modular reactor based on the line B-B).

Figure 4:
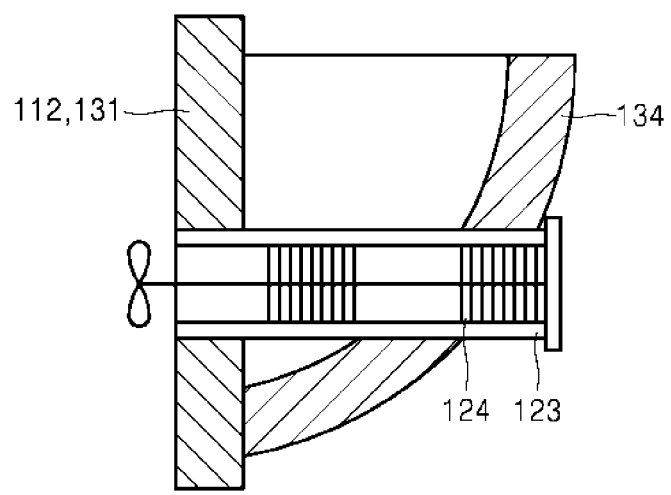
FIG. 4 is a cross sectional view taken along a line P-P of FIG. 3.

Referring to FIGS. 3 and 4, cylindrical tubes 123 may be provided between the steam generator lower head 134 and the reactor vessel cylindrical shell 112. The cylindrical tubes 123 may be installed in the reactor vessel cylindrical shell 112 and the steam generator lower head 134 in such a manner that the cylindrical tubes 123 penetrate the reactor vessel cylindrical shell 112 and the steam generator lower head 134. The insides of the cylindrical tubes 123 communicate with the inside of the nuclear reactor 110.

The cylindrical tubes 123 may be installed in combination with the partition plates 141. That is, the cylindrical tubes 123 may be provided under the partition plates 141, and like the partition plates 141, the cylindrical tubes 123 provided in the lower portion of the steam generator 130 may divide the inner space of the steam generator 130.

Reactor coolant pumps 124 may be provided in the cylindrical tubes 123. The reactor coolant pumps 124 may provide power for smooth fluid flow (described later) in the nuclear reactor 110 (FIG. 3 is a cross sectional view taken along a line A-A of FIG. 2, illustrating a lower portion of the externally integrated once-through steam generator type small modular reactor based on the line A-A).

A lower heat transfer tube sheet 142 coupled to the steam generator inner shell 131 and the steam generator outer shell 132, and having a plate shape along the circumference of the steam generator 130 is provided in the lower portion of the steam generator 130, and an upper heat transfer tube sheet 143 coupled to the steam generator inner shell 131 and the steam generator outer shell 132, and having a plate shape along the circumference of the steam generator 130 is provided in the upper portion of the steam generator 130.

The lower heat transfer tube sheet 142 and the upper heat transfer tube sheet 143 are respectively provided in the lower and upper portions of the steam generator 130, and each of the lower heat transfer tube sheet 142 and the upper heat transfer tube sheet 143 extends along the circumference of the steam generator 130 in a doughnut shape.

The lower heat transfer tube sheet 142 is placed above the steam generator lower head 134, and the upper heat transfer tube sheet 143 is placed below the steam generator upper head 133. The lower heat transfer tube sheet 142 and the upper heat transfer tube sheet 143 may be formed integrally with or in one piece with the steam generator inner shell 131 and the steam generator outer shell 132.

Holes may be formed in the lower heat transfer tube sheet 142 and the upper heat transfer tube sheet 143 so as to couple heat transfer tubes 144 to the holes. That is, the heat transfer tubes 144 may be coupled to the lower heat transfer tube sheet 142 and the upper heat transfer tube sheet 143 by inserting the heat transfer tubes 144 into the holes. The heat transfer tubes 144 are straight from the lower heat transfer tube sheet 142 to the upper heat transfer tube sheet 143, and a fluid may flow in the heat transfer tubes 144.

Referring to FIG. 2, the externally integrated once-through steam generator type small modular reactor of the embodiment may further include a plate-shaped shroud 150 placed between the steam generator inner shell 131 and the heat transfer tubes 144. The shroud 150 may extend from a lower portion of the steam generator inner shell 131 to the upper portion of the steam generator inner shell 131 and may extend in a ring shape along the circumference of the steam generator inner shell 131.

The shroud 150 is a plate dividing the inner space of the steam generator 130 and may be placed between the steam generator inner shell 131 and the heat transfer tubes 144 (here, the heat transfer tubes 144 refer to heat transfer tubes 144 closest to the steam generator inner shell 131). The shroud 150 may extend in a ring shape along the circumference of the steam generator inner shell 131 and may divide the inner space of the steam generator 130.

In a division region of the space divided by the shroud 150 which is close to the steam generator inner shell 131, primary cooling water discharged from the core 114 flows to the upper portion of the steam generator 130, and in the other division region of the space divided by the shroud 150 in which the heat transfer tubes 144 are arranged, a fluid introduced into the upper portion of the steam generator 130 flows to the lower portion of the steam generator 130 (fluid flow will be described later).

The shroud 150 may be coupled to a lower flow distribution plate 151 provided above the lower heat transfer tube sheet 142 and may be coupled to an upper flow distribution plate 152 provided under the upper heat transfer tube sheet 143. The lower flow distribution plate 151 and the upper flow distribution plate 152 are installed on the steam generator inner shell 131 and the steam generator outer shell 132 and extend in a ring shape along the circumference of the steam generator 130. The lower flow distribution plate 151 includes a region in which holes are formed to allow a fluid to flow therethrough and a region in which no hole is formed. The region of the lower flow distribution plate 151 in which no hole is formed may be located close to the steam generator inner shell 131 (a fluid may flow through the holes of the other region of the lower flow distribution plate 151). The shroud 150 may be installed on the region of the lower flow distribution plate 151 in which no hole is formed.

Holes may be formed in a region of the upper flow distribution plate 152 close to the steam generator inner shell 131, and thus a fluid flowing in the steam generator 130 along the shroud 150 may pass through the holes of the upper flow distribution plate 152.

Figure 7:
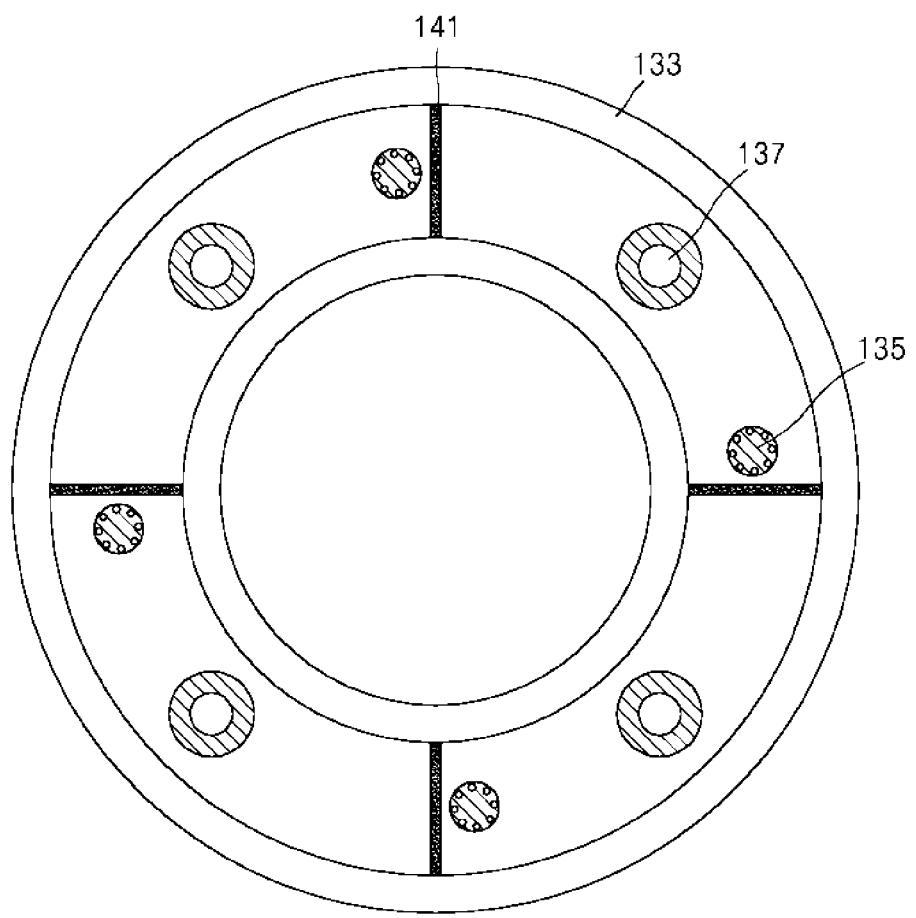
FIG. 7 is a plan view illustrating a steam generator upper head according to an embodiment.

Referring to FIG. 7, manways 135 are detachably coupled to the steam generator upper head 133 or the steam generator lower head 134. The manways 135 are detachably coupled to the steam generator upper head 133 or the steam generator lower head 134 using stud bolts, and maintenance work may be performed on the inside of the steam generator 130 after detaching the manways 135.

Steam outlet nozzles 137 are formed in the steam generator upper head 133. Steam generated from the heat transfer tubes 144 may flow to the steam generator upper head 133 and may be discharged through the steam outlet nozzles 137.

Control rod driving devices 170 are installed in the upper head 111 of the nuclear reactor 110, and nozzles connected to a pressurizer injection system and a discharge system of a reactor coolant system are installed in the upper head 111 of the nuclear reactor 110. The control rod driving devices 170 are inserted into the upper head 111 and connected to the core 114 through guide tubes.

Figure 8:
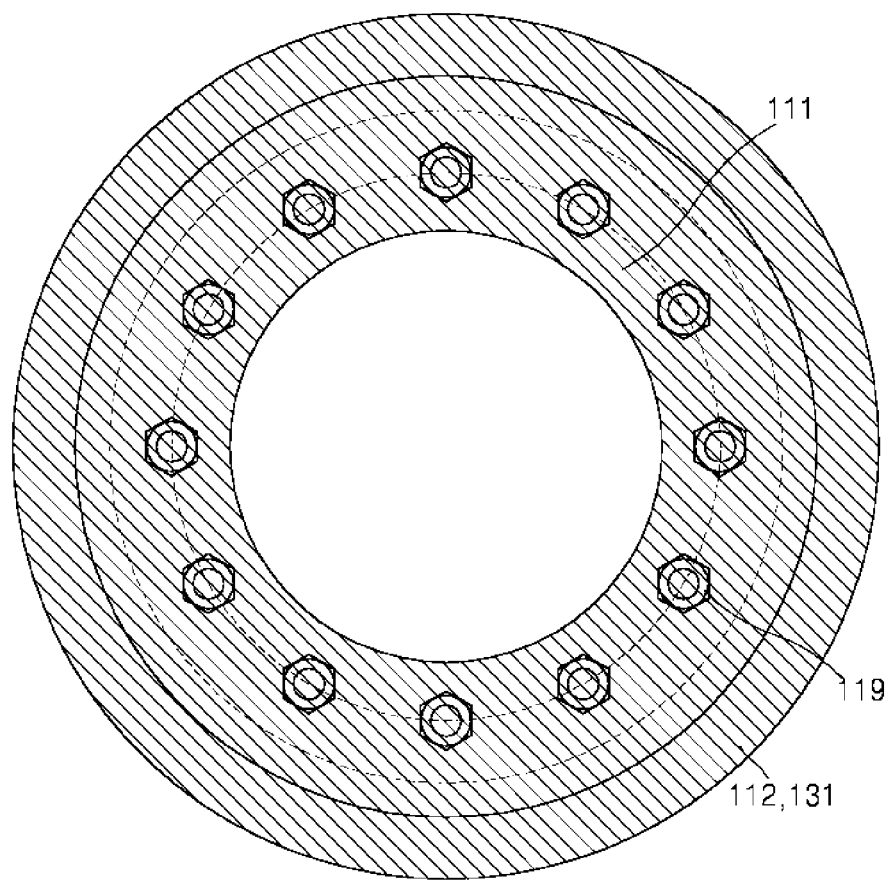
FIG. 8 is a plan view illustrating an assembled state of a reactor vessel cylindrical shell and an upper head according to an embodiment.

A cylindrical shell flange 117 protruding inward from the reactor vessel cylindrical shell 112 and having stud bolt holes is provided on the reactor vessel cylindrical shell 112, and an upper head flange 118 protruding outward from the upper head 111 and having stud bolt holes is provided on the upper head 111. Referring to FIGS. 2 and 8, the upper head 111 and the reactor vessel cylindrical shell 112 may be coupled to each other by joining the upper head flange 118 and the cylindrical shell flange 117 to each other using stud bolts. For example, the upper head 111 and the reactor vessel cylindrical shell 112 may be coupled to each other using stud bolts 119. In this case, the upper head 111 and the reactor vessel cylindrical shell 112 may be easily coupled and separated.

Figure 9:
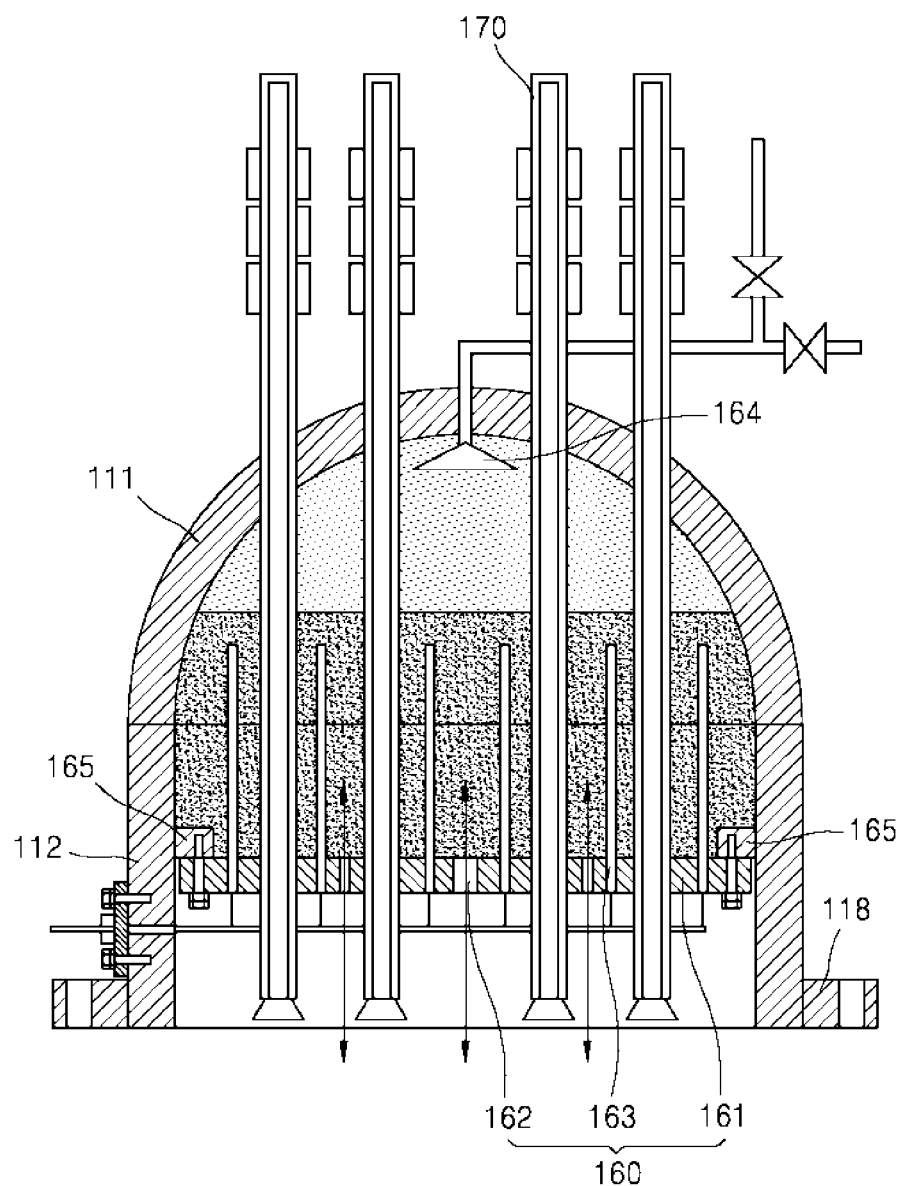
FIG. 9 is a view illustrating a pressurizer provided in a nuclear reactor according to an embodiment.

Referring to FIG. 9, a pressurizer plate 161 in which surge holes 162 are formed to allow a fluid to pass therethrough and electric heaters 163 are installed to heat a fluid may be provided in the nuclear reactor 110. For example, a pressurizer 160 including the surge holes 162, the electric heaters 163, and the pressurizer plate 161 may be provided in the upper head 111 of the nuclear reactor 110. The pressurizer 160 may adjust the inside pressure of the core 114, and a fluid may be introduced between the pressurizer plate 161 and the upper head 111 to adjust the inside pressure of the core 114. The pressurizer 160 may include a spray 164 to adjust the pressure of the fluid. The pressure of the core 114 may be adjusted using the pressurizer 160 by a well-know method, and thus a description thereof will not be presented here.

The pressurizer plate 161 may be provided in a lower portion of the upper head 111 or at a position at which the reactor vessel cylindrical shell 112 and the upper head 111 meet each other. The pressurizer plate 161 may be installed using a protrusion 165 which has stud bolt holes and protrudes inward from the nuclear reactor 110 in a ring shape. The pressurizer plate 161 may be coupled to the protrusion 165 using stud bolts.

In the externally integrated once-through steam generator type small modular reactor of the embodiment, heat generated in the core 114 is distributed using a fluid. Fluid flow in the externally integrated once-through steam generator type small modular reactor is as follows.

Referring to FIGS. 2 and 6, a cylindrical core support barrel assembly 115 in which the core 114 is placed is provided in the nuclear reactor 110, and the core support barrel assembly 115 extends in the longitudinal direction of the reactor vessel cylindrical shell 112. The cylindrical core support barrel assembly 115 includes core penetration holes 116 communicating with the first penetration holes 120, and the second penetration holes 121 communicate with a space between the reactor vessel cylindrical shell 112 and the cylindrical core support barrel assembly 115.

That is, the core 114 is placed in the cylindrical core support barrel assembly 115 provided inside the nuclear reactor 110. Since the core support barrel assembly 115 includes the core penetration holes 116 communicating with the first penetration holes 120, primary cooling water heated by the core 114 may flow to the first penetration holes 120 through the core penetration holes 116. Exit nozzles 1161 connected from the reactor vessel cylindrical shell 112 to the core support barrel assembly 115 are provided concentric with the core penetration holes 116. Owing to the exit nozzles 1161, the primary cooling water may not flow to the space between the reactor vessel cylindrical shell 112 and the core support barrel assembly 115.

The lower flow distribution plate 151 may be provided above the lower heat transfer tube sheet 142 and connected to lower sides of the first penetration holes 120. Along with this, the shroud 150 may be coupled to the region of the lower flow distribution plate 151 in which no hole is formed and may extend upward along the steam generator inner shell 131.

Owing to the lower flow distribution plate 151 and the shroud 150, primary cooling water introduced through the first penetration holes 120 may flow upward along the shroud 150 to the upper portion of the steam generator 130. The shroud 150 is coupled to the upper flow distribution plate 152, and the primary cooling water may flow upward to the upper flow distribution plate 152.

The upper flow distribution plate 152 includes holes, and the primary cooling water that has flown upward to the upper flow distribution plate 152 along the shroud 150 flows to a space between the upper flow distribution plate 152 and the upper heat transfer tube sheet 143 through the holes of the upper flow distribution plate 152 (FIG. 6 is a cross sectional view taken along a line C-C of FIG. 2, illustrating an upper portion of the externally integrated once-through steam generator type small modular reactor based on the line C-C. Since FIG. 6 is a cross section view showing an upper portion of the externally integrated once-through steam generator type small modular reactor, holes 153 of the upper flow distribution plate 152 located inside the shroud 150 are shown in FIG. 6, and primary cooling water flowing along the shroud 150 passes through the holes 153 of the upper flow distribution plate 152).

Holes may be formed in the entire region of the upper flow distribution plate 152, and primary cooling water introduced into the space between the upper flow distribution plate 152 and the upper heat transfer tube sheet 143 may flow through the holes of the upper flow distribution plate 152 to an inner region of the steam generator 130 in which the heat transfer tubes 144 are provided.

The primary cooling water flows downward along the outsides of the heat transfer tubes 144 in the inner region of the steam generator 130 in which the heat transfer tubes 144 are provided and reaches a region in which the second penetration holes 121 are provided.

Since secondary cooling water is filled in the heat transfer tubes 144, the primary cooling water flowing downward along the outsides of the heat transfer tubes 144 in the steam generator 130 may exchange heat with the secondary cooling water.

Referring to FIG. 5, the second penetration holes 121 communicate with the space between the reactor vessel cylindrical shell 112 and the cylindrical core support barrel assembly 115. Therefore, the primary cooling water passing through the second penetration holes 121 is introduced into the space between the reactor vessel cylindrical shell 112 and the cylindrical core support barrel assembly 115 and then into the lower head 113. Then, the primary cooling water is introduced back into the core 114 and is reused.

When the primary cooling water introduced through the second penetration holes 121 flows in the space between the reactor vessel cylindrical shell 112 and the cylindrical core support barrel assembly 115, the reactor coolant pumps 124 provided in the cylindrical tubes 123 may provide power for smooth fluid flow.

The secondary cooling water introduced into the heat transfer tubes 144 may exchange heat with the primary cooling water and may flow in the heat transfer tubes 144 toward the upper portion of the steam generator 130. The secondary cooling water may be supplied through feed water nozzles 136 provided in the steam generator lower head 134. The secondary cooling water may be introduced into the heat transfer tubes 144 through the lower heat transfer tube sheet 142. While the secondary cooling water introduced into the heat transfer tubes 144 flows to the upper portion of the steam generator 130, the secondary cooling water may receive heat from the primary cooling water and may be changed to steam and superheated steam. The superheated steam may be collected in the steam generator upper head 133 and may then be discharged to the outside through the steam outlet nozzles 137 formed in the steam generator upper head 133.

According to an embodiment, when nuclear fuel of the core 114 of the externally integrated once-through steam generator type small modular reactor is replaced, the upper head 111 may be detached and lifted, and an upper portion of the nuclear reactor 110 may be filled with water (refueling water) so as to block radiation passing through the upper portion of the nuclear reactor 110.

Since the steam generator inner shell 131 extends upward from the reactor vessel cylindrical shell 112, a space 138 surrounded by the steam generator inner shell 131 is formed on an upper portion of the reactor vessel cylindrical shell 112 (since the steam generator inner shell 131 surrounds the reactor vessel cylindrical shell 112 in a ring shape, the space 138 surrounded by the steam generator inner shell 131 has a cylindrical shape). The cylindrical space 138 surrounded by the steam generator inner shell 131 may be filled with a fluid after the upper head 111 is detached and lifted, and thus the steam generator inner shell 131 may function as a refueling pool (refueling water pool). In this manner, water for blocking radiation passing through the upper portion of the nuclear reactor 110 may be filled in the cylindrical space 138 surrounded by the steam generator inner shell 131.

The externally integrated once-through steam generator type small modular reactor of the embodiment may have the following effects.

In the externally integrated once-through steam generator type small modular reactor of the embodiment, the steam generator 130 is arranged along the circumference of the nuclear reactor 110. Therefore, the heat-transfer area of the steam generator 130 may be increased, and the externally integrated once-through steam generator type small modular reactor may have a simple structure and a high degree of space utilization efficiency. That is, owing to the concentric structure formed by arranging the steam generator 130 along the outer circumference of the nuclear reactor 110, problems relating to spatial efficiency may be solved.

Since the steam generator 130 is spatially separated from the inside of the nuclear reactor 110, the inside space of the nuclear reactor 110 may be efficiently used, and thus components such as the pressurizer 160 may be easily placed in the nuclear reactor 110. Furthermore, in the externally integrated once-through steam generator type small modular reactor, superheated steam may be generated from secondary cooling water flowing in the heat transfer tubes 144. When secondary cooling water is discharged to the outside, peripheral components of a reactor may be negatively affected because of a high moisture concentration. Thus, steam of secondary cooling water should be discharged to the outside after removing moisture from the steam. In general, moisture separators and steam dryers are used to remove moisture from steam of secondary cooling water.

In the externally integrated once-through steam generator type small modular reactor of the embodiment, secondary cooling water flows in the heat transfer tubes 144. The secondary cooling water flowing in the heat transfer tubes 144 exchanges heat with primary cooling water flowing outside the heat transfer tubes 144 and thus changes to superheated steam having no moisture owing to a large amount of heat received from the primary cooling water. That is, since secondary cooling water flows in the heat transfer tubes 144, the secondary cooling water may intensively receive a large amount of heat from primary cooling water via the heat transfer tubes 144 and may thus change to superheated steam having no moisture. Since superheated steam does not contain moisture, additional moisture separators or steam dryers are not necessary. Thus, the externally integrated once-through steam generator type small modular reactor of the embodiment may have a high degree of spatial efficiency.

According to the embodiment, in a structure in which the reactor vessel cylindrical shell 112 and the steam generator inner shell 131 of the externally integrated once-through steam generator type small modular reactor are integrated with or formed in one piece with each other, the first penetration holes 120 connecting the nuclear reactor 110 to the steam generator 130 are provided, and the second penetration holes 121 separate from the first penetration holes 120 and connecting the nuclear reactor 110 to the steam generator 130 are provided. Therefore, the externally integrated once-through steam generator type small modular reactor of the embodiment may be designed without using pipes. Large nuclear power plants of the related art use pipes, and thus the risk of pipe break is always present. However, the embodiment realizes designs not using pipes, and thus dynamic loads caused by pipe break may not be applied to components, structures, and systems, and thus the amount of engineering work for designing and analysis may be reduced.

According to the embodiment, the steam generator 130 is arranged along the circumference of the nuclear reactor 110, and thus the design of the steam generator 130 may be easily modified. In small-medium modular reactors of the related art, a steam generator is integrated with an inner side of a nuclear reactor, and thus it is difficult to change the design of the steam generator due to a limited space of the nuclear reactor. According to the embodiment, however, the steam generator 130 is arranged along the circumference of the nuclear reactor 110, and thus if necessary, the design of the steam generator 130 may be easily modified.

In the small-medium modular reactor of the related art, a complex structure is used to maintain a pressure boundary between primary cooling water used in the core 30 and secondary cooling water used in the steam generator 20 provided in the reactor vessel 10. In addition, since the pressure boundary between primary cooling water and secondary cooling water is scattered in the reactor vessel 10, a complex structure is required to maintain the pressure boundary. According to the embodiment, however, since the steam generator 130 is arranged along the circumference of the nuclear reactor 110, space may be easily utilized, and a pressure boundary of cooling water may be simply maintained using the lower heat transfer tube sheet 142, the upper heat transfer tube sheet 143, and the heat transfer tubes 144 provided in the steam generator 130.

In addition, the inner space of the steam generator 130 is divided by the partition plates 141, and the steam generator modules 140 are independently provided in the divided inner space of the steam generator 130. Therefore, the number of the steam generator modules 140 may be increased according to the design and capacity of the reactor coolant system.

Along with this, the manways 135 are detachably provided in the steam generator upper head 133 or the steam generator lower head 134. Owing to the manways 135, maintenance of the steam generator 130 may be easily performed, and since the heat transfer tubes 144 of the steam generator 130 are straight, the heat transfer tubes 144 may be easily replaced compared to heat transfer U-tubes.

In an integration design of the related art for installing a pressurizer in a nuclear reactor, access paths for inspection and maintenance of the inside of the pressurizer and a penetration portion of a reactor upper head are limited. In the externally integrated once-through steam generator type small modular reactor of the embodiment, however, the protrusion 165 is provided inside the nuclear reactor 110, and the pressurizer plate 161 is coupled to the protrusion 165 using stud bolts. Therefore, the pressurizer plate 161 may be easily detached, and inspection and maintenance may be easily performed on the inside of the pressurizer 160.

In addition, according to the embodiment, the upper head 111 and the reactor vessel cylindrical shell 112 are coupled to each other by joining the cylindrical shell flange 117 provided on the reactor vessel cylindrical shell 112 to the upper head flange 118 provided on the upper head 111 by using stud bolts 119. Therefore, the upper head 111 may be easily detached from the reactor vessel cylindrical shell 112, and thus an access path for inspection and maintenance of a penetration portion of the upper head 111 of the nuclear reactor 110 may be secured.

In addition, when nuclear fuel of the core 114 is replaced, the upper head 111 is detached and lifted, and the core 114 is replaced. Radiation passing through the upper portion of the nuclear reactor 110 is blocked when the core 114 is replaced, and to this end, the upper portion of the nuclear reactor 110 is filled with water (refueling water). According to the embodiment, the cylindrical space 138 surrounded by the steam generator inner shell 131 is provided on the upper portion of the reactor vessel cylindrical shell 112. Therefore, the cylindrical space 138 may be used as a refueling water pool to fill water (refueling water) therein when the core 114 is replaced, and thus radiation passing through the upper portion of the nuclear reactor 110 may be blocked during the replacement of the core 114.

According to the externally integrated once-through steam generator type small modular reactor of the embodiment, the heat-transfer area of the steam generator 130 may be increased. In addition, since pipe break is prevented, weight reduction, relaxation of environmental qualification conditions, and reduction in the capacity of a safe injection system for emergency core cooling may be achieved. In addition, since the steam generator 130 is integrated with or formed in one piece with the outer side of the nuclear reactor 110, space utilization efficiency may be increased, and maintenance work may be easily performed. Furthermore, since the steam generator 130 is provided outside the nuclear reactor 110, the capacity and size of the steam generator 130 may be flexibly determined.

The externally integrated once-through steam generator type small modular reactor of the embodiment may be manufactured as follows.

The externally integrated once-through steam generator type small modular reactor of the embodiment may be manufactured by coupling a plurality forged members or materials to each other. Since the steam generator 130 is arranged in a ring shape along the circumference of the nuclear reactor 110, formation of particular structures such as joining and welding of vessels or shells should be guaranteed. Thus, the externally integrated once-through steam generator type small modular reactor of the embodiment may be manufactured by manufacturing a plurality forged members and welding the forged members.

Figure 10:
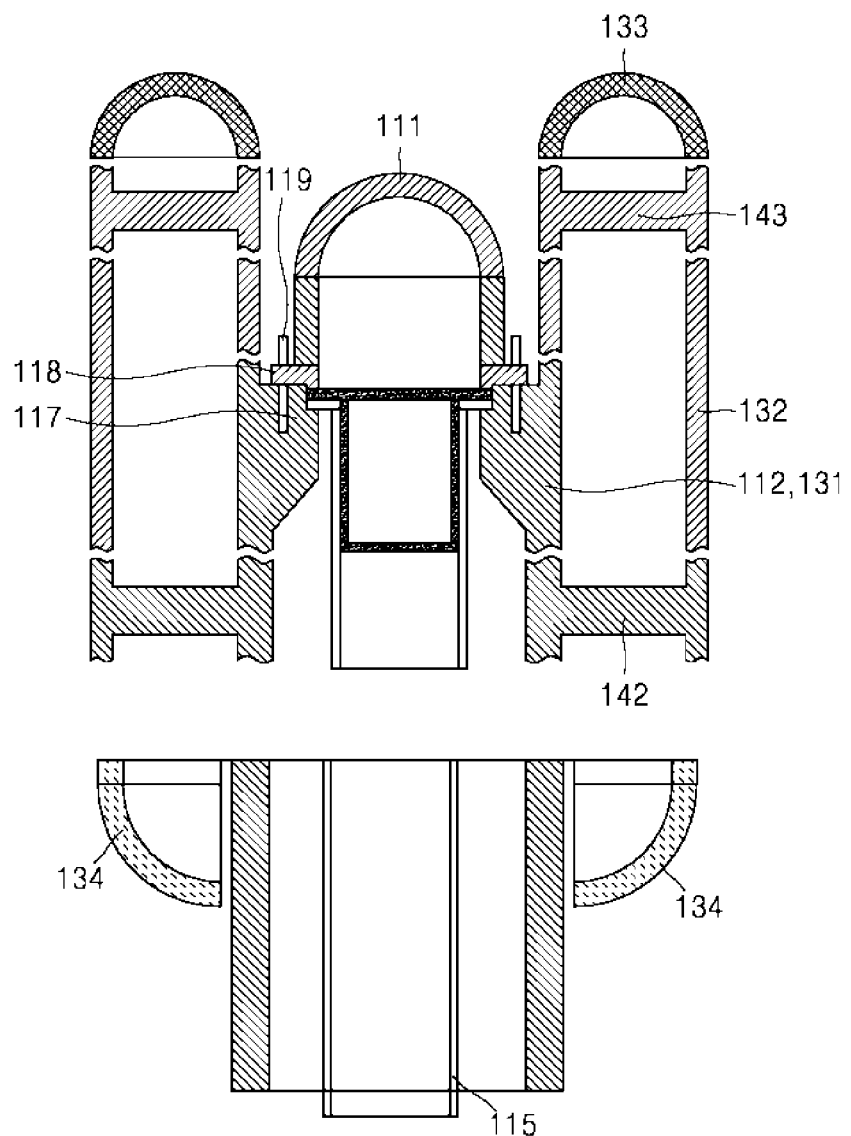
FIG. 10 is view illustrating forged members for the externally integrated once-through steam generator type small modular reactor according to an embodiment.

Referring to FIG. 10, the forged members may be distinguished as follows: a forged member for the cylindrical shell flange 117 and the steam generator inner shell 131; a forged member for the reactor vessel cylindrical shell 112, the lower heat transfer tube sheet 142, and the steam generator outer shell 132; a forged member for the steam generator lower head 134; a forged member for the steam generator inner shell 131, the upper heat transfer tube sheet 143, and the steam generator outer shell 132; a forged member for the steam generator upper head 133; a forged member for the steam generator inner shell 131; a forged member for the steam generator outer shell 132; a forged member for the reactor vessel cylindrical shell 112; a forged member for the upper head 111; a forged member for the upper head flange 118; a forged member for the lower head 113; etc.

Figure 11:
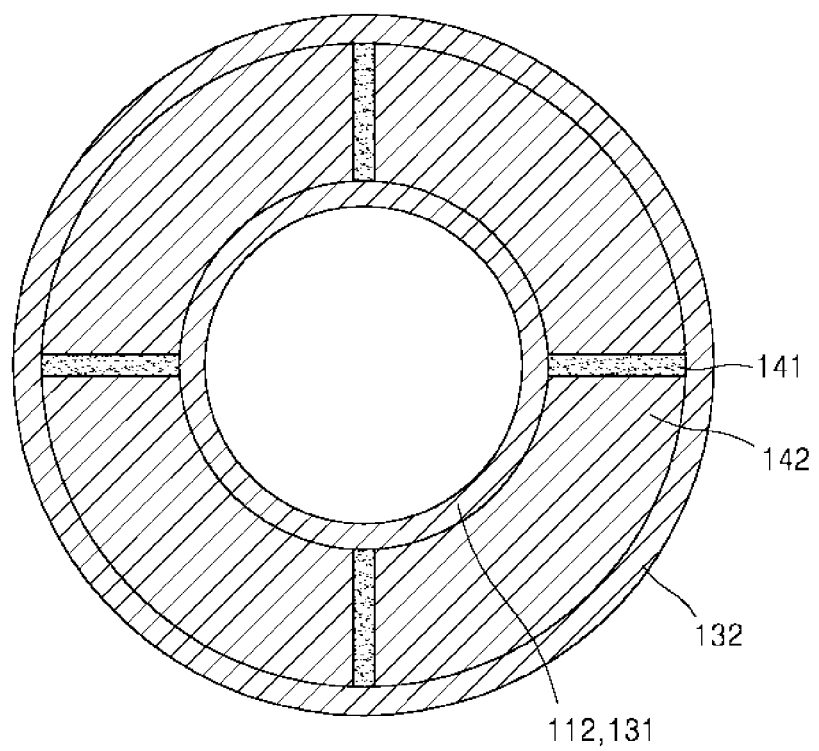
FIG. 11 is a plan view illustrating a forged member for the reactor vessel cylindrical shell, a lower heat transfer tube sheet, and a steam generator outer shell according to an embodiment.

Basically, the forged members may be manufactured in a ring shape. For example, the steam generator lower head 134 may be a doughnut-shaped forged member having a quarter-circular cross section, and referring to FIG. 11, the forged member for the reactor vessel cylindrical shell 112, the lower heat transfer tube sheet 142, and the steam generator outer shell 132 may have a ring shape.

The above-described forged members may be welded to each other to manufacture the externally integrated once-through steam generator type small modular reactor of the embodiment. Distinguishment of forged members is not limited to the above-described method. That is, various forged members may be used according to manufacturing conditions. If the externally integrated once-through steam generator type small modular reactor is manufactured using the forged members and the manufacturing method described above, the externally integrated once-through steam generator type small modular reactor may be simply manufactured with low costs in a short construction time.

As described above, according to the one or more of the above embodiments, the steam generator 130 is arranged along the circumference of the reactor vessel cylindrical shell 112, and thus the heat transfer area of the steam generator 130 may be increased. In addition, since pipe break is prevented, weight reduction, relaxation of environmental qualification conditions, and reduction in the capacity of a safe injection system for emergency core cooling may be achieved.

In addition, according to the embodiments, secondary cooling water flows in the heat transfer tubes 144 and changes to superheated steam. Thus, devices such as moisture separators and steam dryers for removing moisture from secondary cooling water may not be used, and thus the spatial efficiency of the externally integrated once-through steam generator type small modular reactor may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus comprising:
  a nuclear reactor comprising an upper head, a reactor vessel shell coupled to the upper head, the reactor vessel shell comprises a cylindrical shape, a lower head provided on a lower portion of the reactor vessel shell, and a core located within an interior of the nuclear reactor; and
  a steam generator surrounding a circumference of the reactor vessel shell, the steam generator comprising a first penetration hole and a second penetration hole, the first penetration hole in fluid communication with the interior of the nuclear reactor such that a fluid flows between the interior of the nuclear reactor and an interior of the steam generator, the second penetration hole being separate from the first penetration hole and in fluid communication with the inside of the nuclear reactor, such that a fluid flows between the interior of the nuclear reactor and an interior of the steam generator, wherein the steam generator further comprises:
    a steam generator inner shell connected to or formed in one piece with the reactor vessel shell and surrounding 360 degrees the circumference of the reactor vessel shell, wherein the steam generator inner shell shares a portion with the reactor vessel shell and extends in a longitudinal direction of the reactor vessel shell; and
    a steam generator outer shell spaced apart from the steam generator inner shell and surrounding 360 degrees the circumference of the reactor vessel shell, wherein the steam generator outer shell extends in the longitudinal direction of the reactor vessel shell,
    wherein the first penetration hole and the second penetration hole are provided in a region in which the reactor vessel shell and the steam generator inner shell are connected to or formed in one piece with each other.

2. The apparatus of claim 1, wherein the steam generator further comprises:
  a steam generator upper head connecting an upper portion of the steam generator inner shell to an upper portion of the steam generator outer shell; and
  a steam generator lower head connecting a lower portion of the steam generator outer shell to the reactor vessel shell,
  wherein the steam generator upper head has a semicircular or semielliptical cross section and extends in a ring shape along a circumference of the steam generator, and the steam generator lower head has a circular-arc cross section and extends in a ring shape along the circumference of the steam generator.

3. The apparatus of claim 2, wherein a manway is detachably coupled to the steam generator upper head or the steam generator lower head.

4. The apparatus of claim 2, wherein a plurality of partition plates are arranged at intervals inside the steam generator along the circumference of the steam generator, and a plurality of steam generator modules are respectively provided in spaces separated by the partition plates.

5. The apparatus of claim 4, further comprising a cylindrical tube installed in the steam generator lower head and the reactor vessel shell in such a manner that the cylindrical tube penetrates the steam generator lower head and the reactor vessel shell.

6. The apparatus claim 5, wherein the cylindrical tube is coupled to the partition plates.

7. The apparatus of claim 5, wherein a reactor coolant pump is provided in the cylindrical tube.

8. The apparatus of claim 1, wherein a cylindrical core support barrel assembly extending in the longitudinal direction of the reactor vessel shell and accommodating the core is provided inside the nuclear reactor; and
  the core support barrel assembly comprises a core penetration hole communicating with the first penetration hole, and the second penetration hole communicates with a space between the reactor vessel shell and the core support barrel assembly.

9. The apparatus of claim 1, wherein a lower heat transfer tube sheet is provided in a lower portion of the steam generator, the lower heat transfer tube sheet being coupled to the steam generator inner shell and the steam generator outer shell and having a plate shape along a circumference of the steam generator;
  an upper heat transfer tube sheet is provided in an upper portion of the steam generator, the upper heat transfer tube sheet being coupled to the steam generator inner shell and the steam generator outer shell having a plate shape along the circumference of the steam generator; and
  the externally integrated once-through steam generator type small modular reactor further comprises a heat transfer tube coupled to the lower heat transfer tube sheet and the upper heat transfer tube sheet and extending straight from the lower heat transfer tube sheet to the upper heat transfer tube sheet.

10. The apparatus of claim 9, wherein the lower heat transfer tube sheet or the upper heat transfer tube sheet is connected to or formed in one piece with the steam generator inner shell and the steam generator outer shell.

11. The apparatus of claim 9, further comprising a plate-shaped shroud placed between the steam generator inner shell and the heat transfer tube and extending from a lower portion of the steam generator inner shell toward an upper portion of the steam generator inner shell, the shroud extending in a ring shape along a circumference of the steam generator inner shell.

12. The apparatus of claim 1, wherein a pressurizer plate in which a surge hole is formed to allow a fluid to pass therethrough and an electric heater is installed to heat a fluid is provided in the nuclear reactor.

13. The apparatus of claim 12, wherein a protrusion protruding inward from the nuclear reactor and having a stud bolt hole is provided on the nuclear reactor, and
the pressurizer plate is coupled to the protrusion using a stud bolt.

14. The apparatus of claim 1, wherein an cylindrical shell flange protrudes inward from the reactor vessel shell and comprises a stud bolt hole,
an upper head flange protrudes outward from the upper head and comprises a stud bolt hole, and
the upper head and the reactor vessel shell are coupled to each other by joining the shell flange and the upper head flange using a stud bolt.

15. The apparatus of claim 1, wherein the externally integrated once-through steam generator type small modular reactor is manufactured by coupling a plurality of forged members to each other.

16. The apparatus of claim 1, wherein a space formed on an upper portion of the reactor vessel shell and surrounded by the steam generator inner shell is configured to be filled with a fluid.

* * * * *